(12) United States Patent
Yonat et al.

(10) Patent No.: US 6,394,009 B1
(45) Date of Patent: May 28, 2002

(54) METHOD AND APPARATUS FOR THE DISINFECTION OF SOIL

(75) Inventors: Gideon Yonat, Binyamina; Gal Pridan, Herzelia, both of (IL)

(73) Assignee: Margaliot Trade & Fumigation Ltd., Netanya (IL)

( * ) Notice: Subject to any disclaimer, the term of this patent is extended or adjusted under 35 U.S.C. 154(b) by 0 days.

(21) Appl. No.: 09/678,356

(22) Filed: Oct. 3, 2000

(30) Foreign Application Priority Data

Sep. 1, 2000 (IL) .................................................. 138196

(51) Int. Cl.[7] .................................................. F23B 7/00
(52) U.S. Cl. ..................... 110/341; 110/241; 405/128.5
(58) Field of Search ................................ 111/127, 129, 111/118, 123, 121, 126, 924; 110/240, 241, 262, 341, 345, 346; 405/128.1, 128.55, 128.6, 128.8, 128.85

(56) References Cited

U.S. PATENT DOCUMENTS

| | | | | |
|---|---|---|---|---|
| 1,509,340 A | * | 9/1924 | Corson | ........................ 111/129 |
| 4,420,901 A | * | 12/1983 | Clarke | ........................ 47/1.44 |
| 5,111,756 A | * | 5/1992 | Anderson | .................... 110/240 |
| 5,199,354 A | * | 4/1993 | Wood | ........................ 119/241 |
| 5,454,849 A | * | 10/1995 | Rehbein et al. | ................. 71/12 |
| 5,626,087 A | * | 5/1997 | Lompa | ........................ 110/196 |
| 5,988,947 A | * | 11/1999 | Bruso | ........................ 405/128 |
| 5,996,514 A | * | 12/1999 | Arriola et al. | .............. 111/124 |
| 6,029,590 A | * | 2/2000 | Arriola et al. | .............. 111/124 |
| 6,183,532 B1 | * | 2/2001 | Celli | .............................. 71/61 |

* cited by examiner

Primary Examiner—Denise L. Esquivel
Assistant Examiner—K. B. Rinehart
(74) Attorney, Agent, or Firm—Merchant & Gould P.C.

(57) ABSTRACT

Method and apparatus for the disinfection of soil. Flames are generated into the soil, at the desired depth and at predetermined distances between them, so as to produce a relatively uniform heating of the soil. The flames are displaced within the soil along desired trajectories to cover any desired agricultural area. Narrow trenches, such as narrow clefts created in already plowed soil, are created in the soil and the flames are advanced along the trenches concurrently with them. The flames may be produced by igniting streams of liquid or gaseous fuel that are continuously fed to the desired depth in the soil.

15 Claims, 3 Drawing Sheets

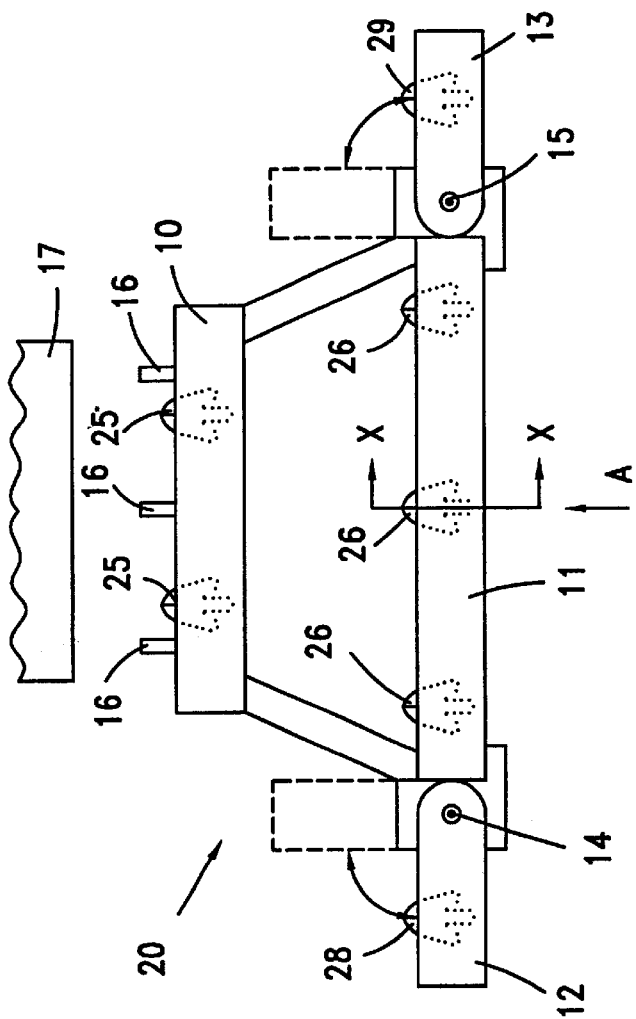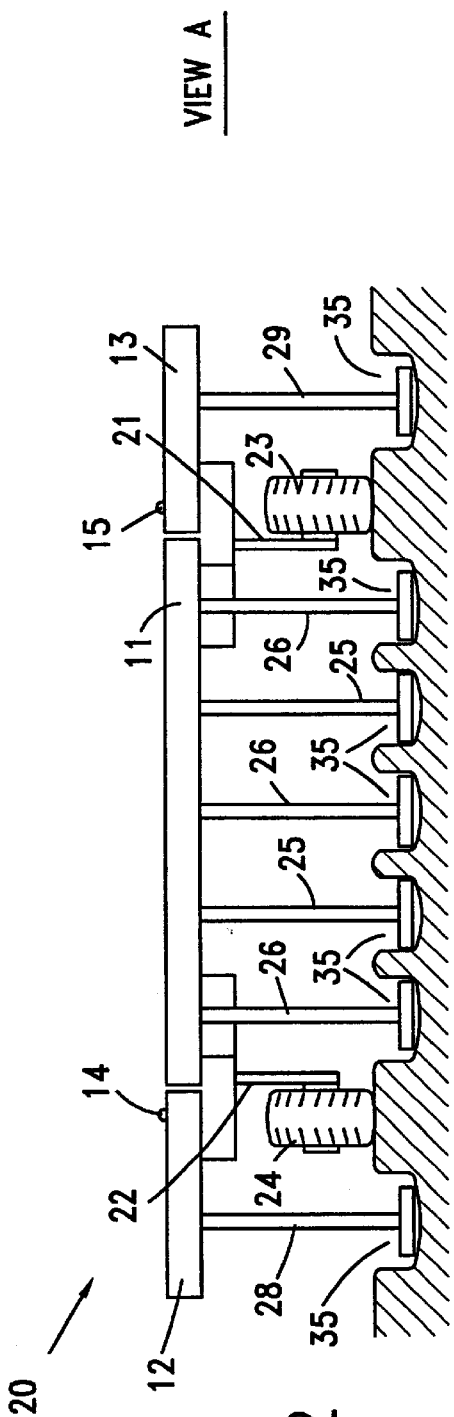
Fig. 1
Fig. 2

SECTION XX

VIEW B

METHOD AND APPARATUS FOR THE DISINFECTION OF SOIL

FIELD OF THE INVENTION

This invention relates to a method and apparatus for destroying unwanted life forms in agricultural soil, particularly soil born pathogens, worms or insects or harmful vegetable life forms, by the application of heat.

BACKGROUND OF THE INVENTION

Before sowing seeds in plowed earth, it is desirable to destroy unwanted and harmful forms of life, such as soil born pathogens, worms, insects and certain vegetable life forms, which may destroy the seeds or interfere with their proper germination. The practice of such a destruction of unwanted life in agricultural soil, herein briefly called "soil fumigation", has been known for a very long time and various means have been adopted for carrying it out. One of the known means is the application of pesticide chemicals or, in general, chemicals that are able to penetrate into the soil and are active in eliminating the harmful forms of life. However, the use of such chemicals is becoming increasingly difficult and in some cases, must be continuously decreased and will be eliminated in a few years because of international agreements for avoiding ecological damage. Chemicals, in general, may be ecologically damaging. Another known method consists in using steam to penetrate into the soil and kill worms, insects and the like. However, the use of steam is not effective or economical, in view of the very large areas which must be treated. Still another method that has been used in the art is to exploit solar radiation. For this purpose, plastic sheets may be spread on the soil, to be heated by the solar radiation and transmit the heat to the soil. This method, too, is not efficient, nor economical, in view of the very large areas involved, and, anyway, is practical only in some seasons and some locations where the solar radiation is sufficiently intense and cannot be considered, therefore, a generally satisfactory method.

It is therefore a purpose of this invention to provide an efficient method for the soil disinfection and in particular, for the destruction of soil born pathogens, worms and insects and the like, as well as harmful vegetable forms of life.

It is another purpose of this invention to provide such a method which is very effective down to a significant depth into the agricultural soil.

It is a further purpose of this invention to provide such a method that can be applied to areas of any dimension.

It is a still further purpose of the invention to provide such a method which is in no way dependent on climatic conditions or on particular seasons.

It is a still further purpose of the invention to provide such a method which has no economical disadvantages and does not require the introduction into the soil of undesirable chemicals.

It is a still further purpose of this invention to provide an apparatus for carrying out the aforesaid method.

It is a still further purpose of the invention to provide such an apparatus that is simple and not costly to build or to operate.

Other purposes and advantages of the invention will appear as the description proceeds.

SUMMARY OF THE INVENTION

The method of the invention is characterized in that flames are generated into the soil, at the desired depth and at predetermined distances between them so as to produce a relatively uniform heating of the soil, and are displaced within the soil along desired trajectories to cover any desired agricultural area.

Preferably, the method is carried out by creating narrow trenches in the soil and advancing the flames along said trenches concurrently with creating the same. Typically, the trenches are narrow clefts created in the soil and particularly in already cultivated soil, which is therefore not compact and easily yields to the creation of clefts or trenches. Preferably, the flames are produced by igniting streams of liquid or gaseous fuel that are continuously fed to the desired depth in the soil. The flow rate of the fuel is determined so as to create in the soil, adjacent to the flame produced by the ignited fuel, a temperature of at least 600° C. and preferably between 1000° and 1500° C. The temperature created in the soil is preferably from 100° to 160° C. More preferably, the clefts or trenches along which the flames are driven are sufficiently close so that the minimum temperature of the soil at intermediate points between them should not be lower than 120° C. Under prevailing conditions, and depending of climatic and seasonal conditions, the amount of heat transmitted to the soil is comprised between 1 million and 1,4 million calories per square meter of soil. The amount of fuel used is calculated, taking into account the nature of the fuel, so as to provide the desired quantity of heat. The speed by which the flames are progressed along the clefts or trenches should be sufficiently low to permit the heat to propagate between neighboring trenches to achieve the desired minimum temperatures of the soil between trenches. The use of the word "trenches" to determine the clefts of the soil through which the flames are caused to progress should not be construed as limiting in any way the shape or dimensions of the said clefts, which will depend on each individual instance and on the shape and size of the tools used to create them, as well as on the condition of the soil before the trenches are created. They may therefore be vertical with straight sides, or have a V-shaped cross-section and may vary from the shape of sharp clefts to that of furrows, such as created by plows.

The apparatus for carrying out the method of the invention comprises a frame which supports a number of tools for creating the trenches in the soil, which will be called hereinafter "plows", without in any way intended to limit their shape or dimensions or mechanical structure by the use of this term, and a corresponding number of burners, situated immediately after the plows. The word "after" refers here to the direction of motion which will be imparted to the apparatus and it merely indicates that the burner travels along a trench that is being created and preferably immediately behind the plow that creates it. The apparatus can be supported by wheels and is provided with means for attaching it to a vehicle, preferably a tractor. In an optional form of the invention, the beam supporting the plow and the burners is provided with two foldable wings, so that it may be spread out when in use to cover a greater width than it will occupy when not in use. Further, in a more preferred embodiment of the invention, two supporting beams are provided, one behind the other, and will support plows and burners in such a way that those carried by one beam will create and heat trenches that are situated between the trenches created and heated by the plows and burners supported by the other beam. The beams need not have the same width, and it may be that the apparatus will create trenches that are closer in the center of the treated area than on the sides. It may be that in this case, the apparatus is advanced in successive treatment stages so that in a second stage, trenches will be created intermediate to those created in the first stage, at least at the sides of the treated areas, so as to produce in the end a uniform treatment of the relevant soil area.

The plows which are part of the device may be of any desired type or shape. They are generally shaped similarly to old-fashioned plows, or simply curved cutting blades, as will be illustrated hereinafter; but their shape and size will depend on the condition of the soil that is being treated. If the soil has been plowed before and is therefore already broken up and offers very little resistance to the advances of the plows, these may act essentially as a protection of the burners, allowing them to advance along the soil without having to displace earth and therefore meet with mechanical resistance. However, if the soil is more compact, more robust plows must be provided and it may even be necessary to provide rotary blades, actuated by power that can be derived from the tractor which pulls the device. The burners should be sufficiently narrow or terminate with a sufficiently narrow outlet pipe to advance behind the plows without encountering any significant resistance of the earth. Otherwise, they may be of any desired type, as conventionally available, and need therefore not be described. Fuel tanks can be provided for each burner on the apparatus itself, or may be carried by the tractor or other pulling device, and fuel can be pumped to the burners by any convenient pump means.

BRIEF DESCRIPTION OF THE DRAWINGS

In the drawings:

FIG. 1 is a schematic plan view showing the main components of an apparatus according to an embodiment of the invention;

FIG. 2 is a rear view of the apparatus of FIG. 1, seen in the direction A of FIG. 1;

DETAILED DESCRIPTION OF PREFERRED EMBODIMENTS

Referring now to FIGS. 1 and 2, 10 and 11 are two beams, respectively the front one and the rear one. The rear one is provided with two wings, 12 and 13, which can be swung back by 90° about pivots 14 and 15 respectively, so that the width of the apparatus when not in operation will be only slightly greater than that of the rear beam 11. However, the wings can be omitted in an optional structure of the apparatus. 16 are attachments for joining the device to the tractor which draws it, and which is only symbolically indicated at 17. The connection between the tractor and the device, which will be called the operative assembly, and is generally indicated by the numeral 20, can be carried out by any convenient mechanical means, therefore need not be described in detail.

Figure 3:
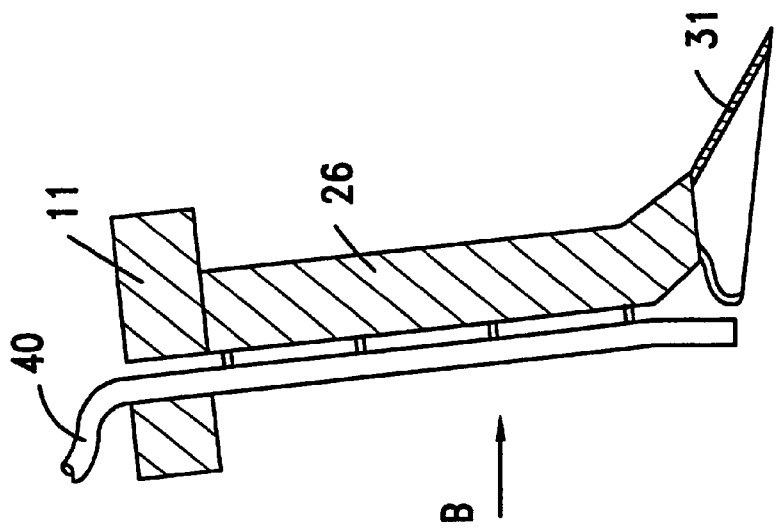
FIG. 3 is a schematic cross-section of an operating leg of the above apparatus, taken on plane X—X of FIG. 1.
Figure 4:
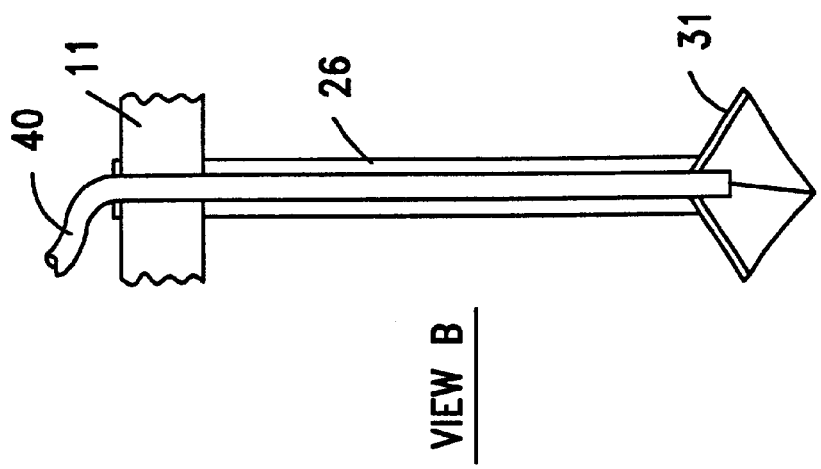
FIG. 4 is a schematic rear view of said operating leg, seen in the direction B of FIG. 3.

The beams 10 and 11 are supported by legs 21 and 22, provided at their bottom with wheels 23 and 24. A greater number of legs and wheels could be provided, but two of each are sufficient, since the apparatus 20 is supported at its front by the attachment 16 to the tractor. The purpose of the aforesaid wheels is to maintain a desired height of the apparatus; however, they can be omitted. The beams 10 and 11 support downward projections 25 and 26 that will be called operating legs, respectively. FIGS. 3 and 4 illustrate in particular, the an operating leg 26, however what is said as to legs 26 equally applies to legs 25. As seen in FIGS. 3 and 4, each leg 26 (or 25) carries a plow 31 and means for projecting a flame onto the soil, which means in this example comprise a conduit 40 for conveying to the soil, immediately behind the plow, the flame produced by a burner, not shown. There is no need to provide a burner for each leg, since a single burner might feed more than one conduit 40. Alternatively, however, a burner could be carried directly by each leg and project its flame directly on the ground.

As the assembly 20 is drawn by the tractor 17, each plow 31 will cut a narrow trench in the soil and the conduit 40 that is attached to the same leg as the plow, or, alternatively, the burner, will produce a flame and heat the bottom and sides of the trench to the desired temperature.

Figure 5:
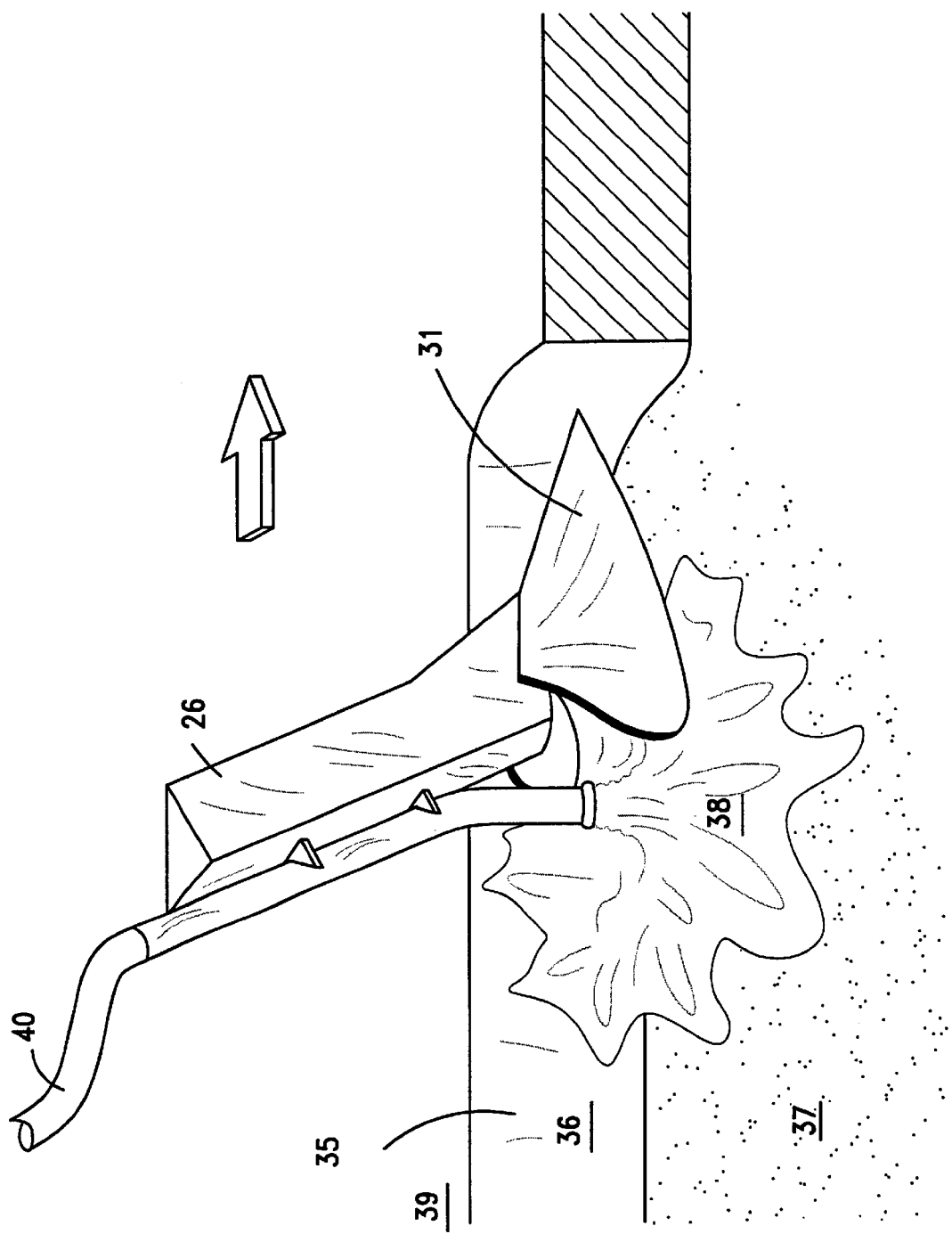
FIG. 5 illustrates a schematic perspective view the operation of the leg of FIGS. 3 and 4.

FIG. 5 schematically illustrates this operation, the trench being broadly indicated at 35 as having sides 36 and bottom 37, and the flame is schematically indicated at 38. In FIG. 5 the trench 35 is illustrated as being on the bottom of a furrow 39, which has been previously produced by the general cultivation of the field in which the invention is carried out, and correspondingly, the plow is merely similar to a blade slanted forwardly; but the plow could be differently structured, and if the ground has not been plowed, it could also have the structure of a rotating wheel. Rotating tools for escalating or creating trenches in the earth are well known, and can easily be provided by expert persons, being quite conventional in the agricultural art. The power for actuating said tools may be provided as mounted on the assembly 20 and connected by suitable transmission to the various rotating tools, or might be drawn from the tractor, as is common in the art.

It will be seen from FIGS. 1 and 2 that the various legs 25–26, with their plows and burners, are so mounted on the beams 10 and 11 that when the assembly 20 advances, the plows carried by one beam generate trenches that are intermediate between the trenches generated by the plows mounted on the rear beam. For instance, in the particular embodiment shown in FIG. 1, the legs 25 and 26 may be placed from, for instance, 50 cm, and the legs 25 will be placed on longitudinal lines which pass between adjacent legs 26 at equal distance from said legs. Wings 12 and 13 carry legs 28 and 29 similarly to the legs 25 and 26, but obviously they will produce trenches that are widely separated from those produced by the plows of legs 25 and 26. Therefore, in order to produce a uniform distance of adjacent trenches, the assembly 20 will be drawn in successive passes so that the legs 25 and 26 will generate trenches that are intermediate between the trenches generated between legs 26 and 28 or 25 and 29 in a previous pass of the device.

In the embodiment described, the burners are assumed to be fed with a spray of liquid fuel produced by pumps carried on the tractor and fed by fuel tanks also carried on the tractor, said pumps and tanks not being illustrated. The spray is conveyed to the burners through lines generally indicated at 40. However, each burner or group of burners could be fed from tanks and pumps carried by the assembly 20.

While an embodiment of the invention has been described by way of illustration, it will be apparent that the invention can be carried out with many modifications, variations and adaptations, without departing from its spirit or exceeding the scope of the claims.

What is claimed is:

1. Method for the disinfection of soil, comprising generating flames into the soil, at a desired depth and at predetermined distances between said flames so as to provide a relatively uniform heating of the soil, creating narrow trenches in the soil, and displacing said flames within the soil along desired trajectories and along said trenches concurrently with creating said trenches.

2. Method according to claim 1, wherein the trenches are narrow clefts created in already plowed soil.

3. Method according to claim 1, wherein the flames are produced by igniting streams of liquid or gaseous fuel that are continuously fed to a desired depth in the soil.

4. Method according to claim 3, wherein the flow rate of the fuel is determined so as to create in the soil, adjacent to the flame produced by the ignited fuel, a temperature of at least 1000° C.

5. Method according to claim 4, wherein the temperature created in the soil is from 100 to 160° C.

6. Method for the disinfection of soil, comprising:

generating flames into the soil, and;

creating narrow trenches in the soil wherein the trenches along which the flames are advanced are sufficiently close so that the minimum temperature of the soil at intermediate points between said trenches is at least 120° C.

7. Method according to claim 6, wherein the amount of the heat transmitted to the soil is comprised between 1,000,000 and 1,400,000 calories per square meter of soil.

8. Method according to claim 6, wherein the speed by which the flames are progressed along the trenches is sufficiently low to permit the heat to propagate between neighboring trenches to achieve the desired relative uniform heating of the soil between trenches.

9. Apparatus for the disinfection of the soil, which comprises a frame supported by wheels, which supports a number of plows and a corresponding number of means for projecting a flame onto the soil, which means are situated immediately behind the plows, said apparatus further comprising means for attaching the apparatus to a tractor.

10. Apparatus according to claim 9, wherein the means for projecting a flame onto the soil comprise burners and conduits for leading the flame of the burners onto the soil.

11. Apparatus according to claim 9, wherein the means for projecting a flame onto the soil comprise burners for producing flames and projecting said flame directly onto the soil.

12. Apparatus according to claim 9, wherein the frame comprises a beam supporting the plows and the means for projecting a flame onto the soil.

13. Apparatus according to claim 12, wherein the beam is provided with legs supporting the plows and the means for projecting a flame onto the soil.

14. Apparatus according to claim 9, wherein the frame comprises two supporting beams, one behind the other, which support plows and means for projecting a flame onto the soil wherein those plows and means carried by one beam will create and heat trenches that are situated between the trenches created and heated by the plows and the means for projecting a flame onto the soil supported by the other beam.

15. Apparatus according to claim 9, wherein the plows are curved cutting blades.

\* \* \* \* \*